United States Patent
Van Der Wolf et al.

(10) Patent No.: US 6,226,715 B1
(45) Date of Patent: May 1, 2001

(54) DATA PROCESSING CIRCUIT WITH CACHE MEMORY AND CACHE MANAGEMENT UNIT FOR ARRANGING SELECTED STORAGE LOCATION IN THE CACHE MEMORY FOR REUSE DEPENDENT ON A POSITION OF PARTICULAR ADDRESS RELATIVE TO CURRENT ADDRESS

(75) Inventors: Pieter Van Der Wolf; Pieter Struik, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/306,069

(22) Filed: May 6, 1999

(30) Foreign Application Priority Data

May 8, 1998 (EP) .................................................. 98201513

(51) Int. Cl.[7] ........................................................ G06F 12/00
(52) U.S. Cl. ........................ 711/133; 711/159; 711/213; 711/137; 711/3
(58) Field of Search .................................. 711/133, 137, 711/159, 3, 213

(56) References Cited

U.S. PATENT DOCUMENTS

| | | | |
|---|---|---|---|
| 5,649,144 | 7/1997 | Gostin et al. ........................ | 711/220 |
| 5,737,565 * | 4/1998 | Mayfield .............................. | 711/213 |
| 5,761,706 * | 6/1998 | Kessler et al. ....................... | 711/118 |
| 5,802,566 * | 9/1998 | Hagersten ............................ | 711/118 |
| 5,870,599 * | 2/1999 | Hinton et al. ....................... | 712/239 |
| 5,941,981 * | 8/1999 | Tran .................................... | 712/207 |
| 5,958,040 * | 9/1999 | Jouppi ................................. | 712/207 |
| 6,105,111 * | 8/2000 | Hammarlund et al. .............. | 711/136 |

FOREIGN PATENT DOCUMENTS

WO 92/20027 * 12/1992 (WO) .

* cited by examiner

Primary Examiner—Do Hyun Yoo
Assistant Examiner—Hong Kim

(57) ABSTRACT

The processing circuit contains a cache management unit which keeps information about a stream of addresses among addresses accessed by the processor. The cache management unit updates a current address for the stream in response to progress of execution of the program. The cache management unit is make selected storage locations in the cache memory available for reuse, a storage location in the cache memory which is in use for the data corresponding to the particular address being made available for reuse dependent on a position of the particular address relative to the current address.

12 Claims, 2 Drawing Sheets

Figure 1:
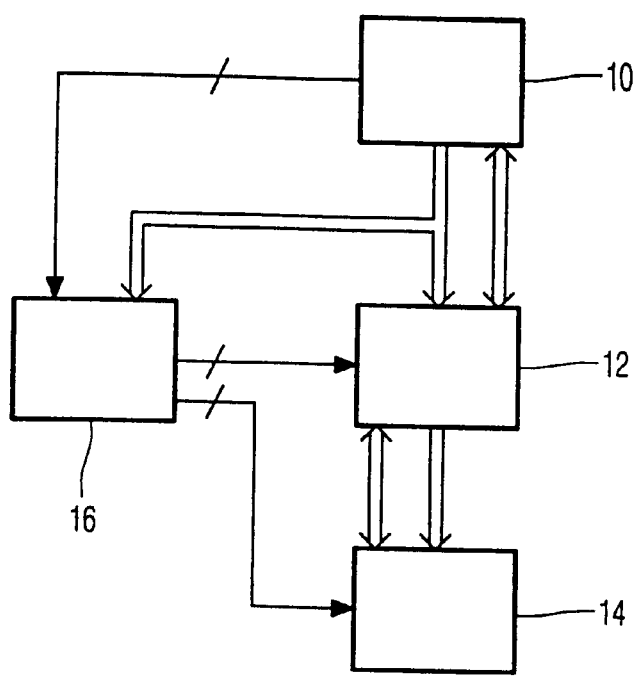

DATA PROCESSING CIRCUIT WITH CACHE MEMORY AND CACHE MANAGEMENT UNIT FOR ARRANGING SELECTED STORAGE LOCATION IN THE CACHE MEMORY FOR REUSE DEPENDENT ON A POSITION OF PARTICULAR ADDRESS RELATIVE TO CURRENT ADDRESS

FIELD OF THE INVENTION

The invention relates to a data processing circuit.

BACKGROUND OF THE INVENTION

A cache memory is a well known instrument for bridging the gap between processor speed and main memory speed. Copies of data from main memory are kept in a cache memory, so that to access such copies the processor needs to access only the fast cache memory and not the slow main memory.

U.S. Pat. No. 5,649,144 provides for a cache management unit that prefetches copies of data into the cache before this data is actually read by the processor. The cache management unit makes use of the concept of address streams and prefetches data from the addresses in the streams, either individually or as part of a prefetched block of data. Each stream is described for example by a base address and a stride value, which define a series of addresses obtainable by starting with the base address and incrementing it repeatedly with the stride value. Both the base address and the stride are adjustable; the stride may take values like plus or minus one or plus or minus a larger value.

The idea behind using address streams is that a typical program executed by the processor will contain instructions that read from the addresses defined by the streams. Once data has been accessed at one address from a stream, it may be expected that in the near future the program will need to access data at a new address obtained by adding the stride value to that one address, possibly after reading from other addresses not belonging to the stream. To anticipate the need for data from new addresses the cache management unit prefetches the data from the new address into the cache memory, so that the processor can quickly fetch the data stored at the new address when it is needed.

Between reading one address and the new address from the stream the processor may read from different addresses, which may be part of different streams or unrelated to any stream. The cache management unit keeps track of progress of the execution of the program by the processor and prefetches data from a particular stream each time when the program executed by the processor has advanced so far that it is expected to a new address from the particular stream at short notice.

The cache management unit must also select cache locations for storing any data needed by the processor, which includes both data stored at addresses belonging to the streams and other data. The cache uses a replacement strategy to select cache locations that it makes available for reuse. One popular replacement strategy, for example, is the LRU strategy (Least Recently Used), which selects the cache memory location occupied by the least recently used data item (or block of data).

If a particular cache memory location is made available for reuse then the data previously stored at that particular cache memory location can only be fetched from slow memory. Therefore, the replacement strategy will have an effect on the efficiency of execution of the program and the use of the bus which connects the process or to main memory. The LRU strategy for example may also reduce the efficiency of the processor and bus use in this way.

Amongst others, it is an object of the invention to provide for a data processing circuit according to the preamble in which the processor can use the cache memory more efficiently.

SUMMARY OF THE INVENTION

The data processing circuit according to the invention the address stream is used for selecting cache memory locations that are made available for reuse. When the cache management unit detects that the processor advances a stride along a stream, "old" data in the cache corresponding to that stream is sacrificed for reuse. The cache memory locations may be made available for reuse individually or a block at a time.

Thus the cache memory locations that are made available for reuse are not necessarily the least recently used cache memory locations. For example, when a stream accesses a vast amount of data in quick succession, cache memory locations used for that data may be made available for reuse more quickly than cache memory locations used for other data, which other data is not part of the stream and which other data is used at a much lower frequency than the frequency with which the stream advances. This reduces the number of cache misses if the data from the stream is not accessed after its cache memory location is made available for reuse.

In general dispersed locations in the cache may be made available. For example, when the stride is not plus or minus one, successive locations that are thus made available for use are not adjacent. In principle a cache memory location that is made available for reuse will be generally available: it may be used for the same stream, for another stream or for data which does not belong to any stream.

The technique according to the invention for making cache memory locations available for reuse can be used in combination with any overall replacement strategy for selecting cache memory locations to make them available for reuse (for example if the technique according to the invention does not make sufficient cache memory locations available for reuse for a particular program). Use of the technique according to the invention will reduce the need to use such an overall replacement strategy, because more cache memory locations will be available.

The invention makes the retention of data in the cache dependent on the need of that data in the program. By keeping data for a stream for a specified time it can be promoted that data is not removed from the cache before the program needs that data again. Also, by timely discarding data from a stream when that data is no longer needed, it can be promoted that sufficient space is created for reuse in the cache so that there is less need to remove other data from the cache that may still be used by the processor.

Preferably, the cache management unit keeps data corresponding to a stream in the cache until it is more than a certain number of strides behind the most recently used new address in the stream. Thus, the relation between the cache memory location that is made available for reuse and access to various memory locations is easily adjustable.

When the stride is relatively large, addresses that are very far apart may be kept in cache, whereas if the stride is relatively small, addresses that are quite close to the most recently used address may already be reused. Similarly, if the processor advances relatively infrequently along a stream data from addresses corresponding to that stream may be kept longer than data from addresses corresponding to a stream along which the processor advances relatively frequently.

When the streams are also used for prefetching data, this has the result that data is kept in cache from respective "sliding windows" of addresses, each window belonging to a respective stream.

In an embodiment of the invention, the processor has an instruction for programming the distance over which data is kept in cache independently for each stream. This may be used for example as follows. For a given program it is known how big a surrounding of a local position in a stream is needed for computations, and therefore it can be determined for each stream how much data should be kept in cache for use by the program and at what distance the data can be discarded from the cache. Thus programs can adapt this distance to their needs. The distance may be specified in many ways, for example as a number of strides, or as an address difference; one instruction might specify the distance for one stream, or for several streams etc.

Advancement of the program along a stream may be detected in several ways, for example by detecting whether the processor issues a read instruction with an address corresponding to a next address in the stream, or by explicit instructions in the program, or by detection of execution of an arbitrary instruction located at a specified instruction address. If the addresses in read instructions are used, the instruction handling part of the processor and data prefetching can be designed independently: information like the value of the program counter is not needed for data prefetching.

BRIEF DESCRIPTION OF THE DESCRIPTION

Figure 2:
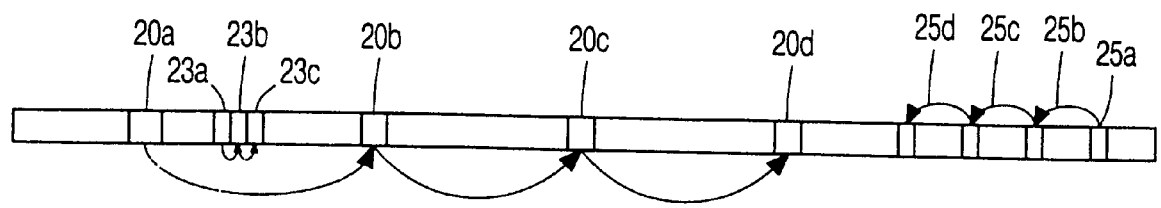
Figure 3:
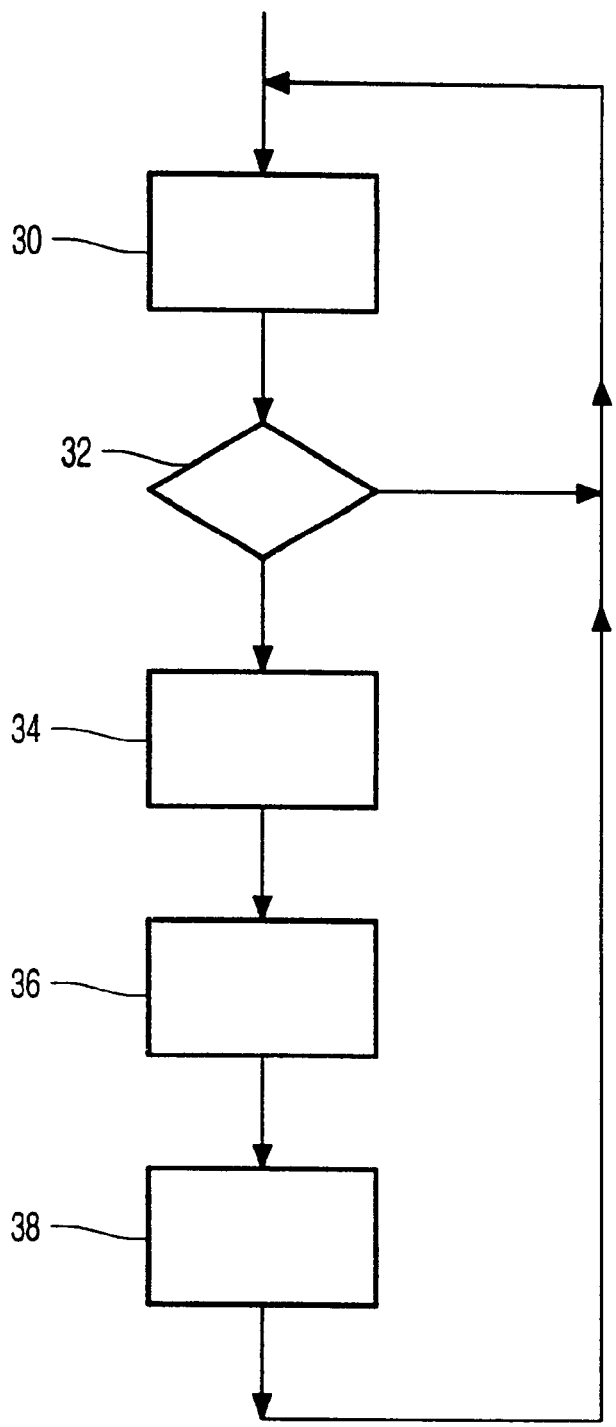

These and other advantageous aspects of the data processing circuit according to the invention will be illustrated in more detail using the following description and figures, in which FIG. 1 shows a processing circuit FIG. 2 shows a memory address space FIG. 3 shows a flow-chart describing operation of a cache management unit.

DETAILED DESCRIPTION

FIG. 1 shows a processing circuit. The processing circuit contains a processor 10, a cache memory 12, a main memory 14 and a cache management unit 16. The processor 10 has an address output coupled to the cache memory 12 and the cache management unit 16. The cache memory 12 has an address output coupled to the main memory 14. The processor 10, and the cache memory 12 have a data connection. The cache memory 12 and the main memory 14 also have a data connection.

The processor 10 may preferably also use an instruction memory (not shown) and an instruction cache (not shown) for storing instructions, but instructions could also be fetched and stored in main memory 14 and or cache memory 12. In general, this does not affect the present invention: the invention is generally concerned with data caching, not with instruction caching. But in case instructions are stored in the cache memory 12 as well, the present invention allows more efficient availability of cache memory space for instruction fetching.

In operation the processor 10 executes a program which contains instructions causing the processor to read and/or write data from or into memory respectively. When the processor 10 executes a read instruction, it issues a read address to the cache memory 12. If the data corresponding to that address is stored in the cache memory 12, the cache memory 12 outputs that data on the data connection to the processor 10. If the data corresponding to the read address is not stored in the cache memory 12, the cache memory outputs the read address of the data, or of a data block (e.g. 64 bytes) containing the read address, to main memory 14. In response, main memory 14 passes back the data (or the data block containing the data) to cache memory 12 which stores the data (or the data block) and passes the data to the processor 10.

In case the processor 10 executes a write instruction, various techniques, such as copy back or write through may be used. When the technique used stores the data from the write instruction into cache memory 12, write may also involve reading from main memory 14, to copy the block of data to which the written data belongs. Hence, fetching from memory is not limited to read instructions from the processor 10.

The cache memory 12 is faster than main memory 14, but also smaller. Therefore, the cache memory 12 is not generally capable of simultaneously storing all data that can be stored in main memory 14. To accommodate for this each storage location in the cache memory 12 may be used alternately for storing data from different locations in main memory 14. There are various well known techniques for realizing this, such as fully associative caches, set associative caches etc. (Any such technique may be used in combination with the invention).

When data is stored at a location in the cache memory 12 which previously stored other data, this location is said to be reused. The data previously stored at the reused location will be overwritten and is therefore no longer available from cache memory 12 after reuse. The overwritten data will have to be retrieved from main memory 14 before it can be read anew by the processor 10.

The cache management unit 16 uses a strategy to select cache memory locations for reuse so that the overwritten data is the data that is least expected to be used again. The cache management unit 16 selects which locations in the cache memory 12 are made available for reuse, so as to reduce the probability that reuse will remove data from the cache that may be needed again by the processor.

According to the invention the cache management unit 16 uses the concept of streams to manage reuse of cache locations. The idea behind this is that among the addresses issued by the processor 10 there may be one or more streams of addresses with a predictable pattern of changing addresses. As the processor 10 advances along these streams data from older addresses in the streams may no longer be needed and the cache management unit can therefore make the storage locations used for this data in the cache memory 12 available for reuse. By making these cache memory locations available for reuse it may be avoided that the cache management unit 16 has to make other cache memory locations available for reuse, which contain data that is still needed by the processor 10.

FIG. 2 shows a memory address space 20 and an example of a number of such streams. A first stream contains successive addresses 20a–d. A second stream contains successive addresses 23a–c and a third stream contains successive addresses 25a–d. Successive locations in the first stream 20a–d have increasing addresses with a large stride between each pair of successive addresses. Successive locations in the second stream 23a–c also have increasing addresses, but with a smaller stride. Successive locations in the third stream 25a–d have decreasing addresses.

Such successions of addresses may correspond for example to addresses in a matrix of numbers. Such a matrix may be stored in memory row after row, with successive elements in a row in successive memory locations. A program using such a matrix may access such a matrix row by row or column by column; in the first case a stream of addresses occurs that increases by one for every next addresses; in the second case a stream of addresses occurs that increase by strides corresponding to the storage space needed to store one row. When the program advances through several matrices at the same time or accesses one matrix in several directions, this will give rise to multiple streams.

Practical programs, for example for spatial filtering of the numbers in the matrix, may have a need for future use of the number fetched from the most recent address from such a stream and in addition thereto also for use of previous numbers fetched from several addresses earlier on in the stream. But numbers further back in the stream are no longer needed. Therefore several such previous numbers should preferably be retained in the cache memory and the cache memory locations for older numbers "further on" may be made available for reuse.

The programmer may include a statement in the program indicating how many of such previous numbers may be needed, or the compiler may determine from the program how many of such previous numbers may be needed. From this, an instruction for the cache management unit 16 can be generated for indicating a distance from the most recently accessed address over which prefetched numbers from addresses of the stream must be retained.

In one embodiment of the invention the cache management unit 16 uses a number of streams and maintains the effective equivalent of a table with a respective entry (CURRENT_ADDRESS, STRIDE, DISTANCE) for each stream. The cache management unit 16 monitors the data addresses issued by the processor 10 to the cache memory 12. Each data address is compared to the CURRENT_ADDRESS entries of the streams. When a data address issued by the processor 10 equals the CURRENT_ADDRESS entry of a particular stream, a stream hit is said to occur for that particular stream. In this case, the CURRENT_ADDRESS entry for this particular stream is increased by the value in the STRIDE entry and the cache management unit 16 makes available for reuse the cache memory location which stores the data corresponding to the address CURRENT_ADDRESS-DISTANCE*STRIDE.

The table entry (CURRENT_ADDRESS, STRIDE, DISTANCE) may be expanded to (CURRENT_ADDRESS, STRIDE, DISTANCE, OLDEST_ADDRESS)

where the OLDEST_ADDRESS entry indicates the oldest address from the stream that is still available.

Initially, when the stream starts, OLDEST_ADDRESS is set equal to CURRENT_ADDRESS. When CURRENT_ADDRESS has changed so much that OLDEST_ADDRESS is not between CURRENT_ADDRESS and CURRENT_ADDRESS-DISTANCE*STRIDE, then the cache management unit 16 makes the cache memory location corresponding to the OLDEST_ADDRESS available for reuse and changes OLDEST_ADDRESS to OLDEST_ADDRESS+STRIDE.

Preferably, a program executed by the processor 10 signals the properties of the streams to the cache management unit 16. For this purpose the instruction set of the processor 10 preferably contains an instruction for entering entries into the table. Such an instruction may specify a stream number, STRIDE, DISTANCE and an initial value of CURRENT_ADDRESS.

The cache management unit 16 can record the fact that a cache memory location has been made available for reuse in various ways. In a preferred embodiment, the cache management unit 16 maintains a table of valid bits, one for each block (e.g. 64 bytes) of cache memory 12. The valid bit for a block indicates whether that block is "valid" i.e. whether that block contains data that may be returned in response to a read from the processor 10. Initially the valid bits indicate that none of the blocks are valid, and each time a block is (pre-) fetched, the valid bit for that block is set. When data from a block of memory is to be fetched from main memory 14 into cache memory 12, cache management unit 16 searches for a suitable block for which the valid bit is not set and places the fetched data into that block. If no suitable block is available for which the valid bit is not set, cache management unit 16 selects a block according to its replacement strategy and loads the fetched data into that block.

In this preferred embodiment cache management unit 16 clears the valid bit for a block that is made available for reuse because it contains data from a stream that has advanced more than the defined distance past the data stored in the block. Thus, later the cache management unit 16 may select that block for storing fetched data without recourse to its normal replacement strategy.

However, the invention is not limited to this technique for making cache memory locations available for reuse. For example, as an alternative the cache management unit may maintain "available for reuse" bits for cache memory locations or blocks to indicate that the associated cache memory location or block is available for reuse. The available for reuse bits are initially set. When data is stored in a cache memory location, its "available for reuse" bit is cleared and when a stream advances the cache management unit 16 again sets the "available for reuse" bit for the cache memory location whose address is the specified DISTANCE away from the CURRENT_ADDRESS. When the cache management unit 16 searches for an available cache memory location for storing data fetched from main memory 14 it preferably selects a cache memory location for which the "available for reuse" bit is set. A normal replacement strategy needs to be used only if there are no such locations available.

Of course, the invention can be implemented in many other ways. To name but a few: for example DISTANCE may be represented not as a number of strides but as the distance between the CURRENT_ADDRESS and the address that is made available; instead of DISTANCE a separate DISTANT_ADDRESS (equal to CURRENT_ADDRESS-DISTANCE*STRIDE) may be used and maintained by the cache management unit 16; the CURRENT_ADDRESS may be changed before or after making the cache memory specified by DISTANCE available for reuse etc. More complicated prediction of addresses in a stream may be used, for example setting back the CURRENT_ADDRESS by a specified value after a specified number of strides for example to move to a next row of a matrix when an entire row has been prefetched. The processor may provide an instruction for specifying such more complicated prediction.

A mechanism may be used to allow the cache management unit 16 to detect the end of a stream (for example after a specified number of strides) so that the cache management unit 16 may stop prefetching when prefetching reaches the end of the stream, and later stop making cache memory locations available for reuse, once all cache memory locations up until the end of the stream have been made available for reuse. The instruction for specifying a stream may contain a parameter for specifying when a stream should end, or an explicit instruction to end a stream may be used.

Issuing of a data address may be detected from the instruction counter instead of from issued data addresses; in this case the cache management unit 16 is informed of the instruction location of an instruction that is executed when the processor 10 advances along the stream. When the instruction pointer of the processor reaches that location the cache management unit 16 proceeds as when issue of the CURRENT_ADDRESS is detected.

In addition the streams may be used for prefetching data into the cache. When a stream hit occurs with an address at CURRENT_ADDRESS the cache management unit 16 causes the cache memory 12 to prefetch the data stored at CURRENT_ADDRESS+STRIDE. Thus, the data stored at this location will be fetched before it is actually accessed by the processor 12. In further embodiments, data at a greater number N of strides ahead (address: CURRENT_ADDRESS+N*STRIDE) may be fetched ahead so that the slow memory 14 has sufficient time to produce this data before it is actually needed by the processor. The value of N may be adapted to the needs of the program, so that prefetch occurs so far ahead that the data will be in cache memory before it is needed in the processor.

Such prefetching is known per se from the prior art. The invention is concerned with cache reuse, but any known prior art mechanisms for maintaining information about the streams may be used in combination with the invention.

FIG. 3 shows a flow chart describing the operation of the cache management unit 16. In a first step 30 a data address issued by the processor 10 is received. In a second step 32 this address is compared to the CURRENT_ADDRESS value of a stream. If the issued address does not equal the CURRENT_ADDRESS of the stream, the cache management unit 16 repeats the flow chart for the next data address issued by the processor. If the issued address equals the CURRENT_ADDRESS, the cache management unit 16 executes a third step 34, incrementing the CURRENT_ADDRESS. Subsequently a fourth and fifth step 36, 38 making available of the cache storage location used for the main memory address CURRENT_ADDRESS-DISTANCE*STRIDE and optionally causing a prefetch of the contents of the new CURRENT_ADDRESS respectively. After that the flow-chart repeats from the first step. The cache management unit 16 may execute these steps in parallel for the different streams, or sequentially for different streams.

When an "OLDEST_ADDRESS" is used, the fourth step 36 makes the OLDEST_ADDRESS available for reuse if the OLDEST_ADDRESS is between the CURRENT_ADDRESS and CURRENT_ADDRESS-DISTANCE*STRIDE, and changes the OLDEST_ADDRESS to OLDEST_ADDRESS+STRIDE. If necessary this is repeated until OLDEST_ADDRESS is between the CURRENT_ADDRESS and CURRENT_ADDRESS-DISTANCE*STRIDE.

When data has been written into the cache memory 12 from the processor 10, it may be necessary to copy back that data into main memory 14 when the cache memory location which stores that data is reused for storing data from another main memory location. For this purpose, the cache management unit 16 may maintain a table of "dirty" bits for respective cache memory locations or blocks of cache memory locations. Normally these bits are cleared, but when the processor 10 has written data into a cache memory location its associated dirty bit is set. When a cache memory location is reused and its dirty bit is set, the data in the cache memory location is copied back to main memory before it is overwritten.

Thus far it has been described how cache memory locations may be made available for reuse using streams of addresses. In addition, the streams may be used for preventing writeback of data from the cache memory 12 to main memory 14. This concerns data that has been written into the cache memory 12 by the processor 10, which will be called write data. Ordinarily, write data must be written back into main memory 14 before the storage location in cache memory 12 used for such write data can be reused.

However, it may be that particular write data is used only temporarily in the program executed by processor 10 and is never used later. In this case the program may signal that the cache management unit 16 should give this data "no-writeback" status, i.e. that the cache management unit 16 should keep information which indicates that the data need not be written back into main memory 14 once the stream has progressed sufficiently far past this data that its memory location may be made available for reuse.

When storage locations in cache memory 12 used for "no-writeback" data are reused, the write data from cache memory 12 is not written back. But the write data is written back if the write data is not given "no-writeback" status, for example because the write data is needed in another part of the program which is not executed before the cache memory location is made available for reuse because of the advancing stream or because the stream has not yet sufficiently advanced when the cache memory location used for the write data has to be reused.

To realize the "no-writeback" status, the cache management unit 16 may for example clear the "dirty" bit for such data after the last use made of this data by the program, preferably at the time when the cache management unit 16 makes the cache memory location used for that data available for reuse because the current address of the stream has advanced sufficiently beyond the address of the data.

Accordingly, the cache management unit 16 preferably also keeps information for each particular stream indicating whether data from that particular stream may be given "no-writeback" status. And the instruction set of the processor 10 preferably contains an instruction for indicating for each stream whether the data corresponding to that stream should be given "no-writeback" status. Various types of instruction may be used for this. For example, the writeback status may be included in the instruction that defines or starts the stream, or in a separate instruction. A default status (write back or no write back) may be used in the absence of such an instruction.

What is claimed is:

1. A data processing circuit comprising:
   a processor for executing a program;
   a cache memory for caching data for access by the processor; and
   a cache management unit arranged for keeping information about a stream of addresses among addresses accessed by the processor and for managing storage of data in the cache memory depending on whether or not data corresponds to a particular address from the stream, the cache management unit updating a current address for the stream in response to progress of execution of the program, characterized in that the cache management unit is arranged to make selected storage locations in the cache memory available for reuse, and a storage location in the cache memory which is in use for the data corresponding to the particular address is being made available for reuse dependent on a position of the particular address relative to the current address.

2. A data processing circuit according to claim 1, the cache management unit keeping a distance parameter for the stream, the cache management unit making said storage location available for reuse when the particular address is more than said distance away from the current address.

3. A data processing circuit according to claim 2, the processor having an instruction set containing one or more instructions for setting said distance parameter.

4. A data processing circuit according to claim 1, the cache management unit identifying write data that has been written into the cache memory by the processor, the processor having an instruction set containing an instruction for signalling for the stream whether or not the cache management unit should copy back write data written at an address from the stream into main memory before reusing the cache memory location where the write data is stored.

5. A data processing circuit according to claim 1, the cache management unit being arranged for detecting when a data address issued by the processor equals a next expected data address for the stream, and updating the current address in response to said detecting.

6. A data processing circuit according to claim 1, the cache management unit using said stream also to prefetch data from the data addresses belonging to the stream into the cache memory.

7. A data processing circuit according to any one of claim 1, the cache management unit being arranged for keeping information about a plurality of streams of addresses among the addresses accessed by the processor, the cache management unit updating a respective current address for each particular stream independently, in response to progress of execution of the program, and a storage location in the cache memory which is in use for the data corresponding to a particular address in a particular stream being made available for reuse dependent on a position of the particular address relative to the current address of that particular stream.

8. A data processing circuit according to claim 2, the cache management unit being arranged for keeping information about a plurality of streams of addresses among the addresses accessed by the processor, the cache management unit updating a respective current address for each particular stream independently, in response to progress of execution of the program, and a storage location in the cache memory which is in use for the data corresponding to a particular address in a particular stream being made available for reuse dependent on a position of the particular address relative to the current address of that particular stream.

9. A data processing circuit according to claim 3, the cache management unit being arranged for keeping information about a plurality of streams of addresses among the addresses accessed by the processor, the cache management unit updating a respective current address for each particular stream independently, in response to progress of execution of the program, and a storage location in the cache memory which is in use for the data corresponding to a particular address in a particular stream being made available for reuse dependent on a position of the particular address relative to the current address of that particular stream.

10. A data processing circuit according to claim 4, the cache management unit being arranged for keeping information about a plurality of streams of addresses among the addresses accessed by the processor, the cache management unit updating a respective current address for each particular stream independently, in response to progress of execution of the program, and a storage location in the cache memory which is in use for the data corresponding to a particular address in a particular stream being made available for reuse dependent on a position of the particular address relative to the current address of that particular stream.

11. A data processing circuit according to claim 5, the cache management unit being arranged for keeping information about a plurality of streams of addresses among the addresses accessed by the processor, the cache management unit updating a respective current address for each particular stream independently, in response to progress of execution of the program, and a storage location in the cache memory which is in use for the data corresponding to a particular address in a particular stream being made available for reuse dependent on a position of the particular address relative to the current address of that particular stream.

12. A data processing circuit according to claim 6, the cache management unit being arranged for keeping information about a plurality of streams of addresses among the addresses accessed by the processor, the cache management unit updating a respective current address for each particular stream independently, in response to progress of execution of the program, and a storage location in the cache memory which is in use for the data corresponding to a particular address in a particular stream being made available for reuse dependent on a position of the particular address relative to the current address of that particular stream.

* * * * *